This invention relates to a process for the recovery of mineral oil from subterranean formations. More particularly, the present invention is concerned with an improvement in a process which utilizes oil-miscible solvents in secondary recovery operations.

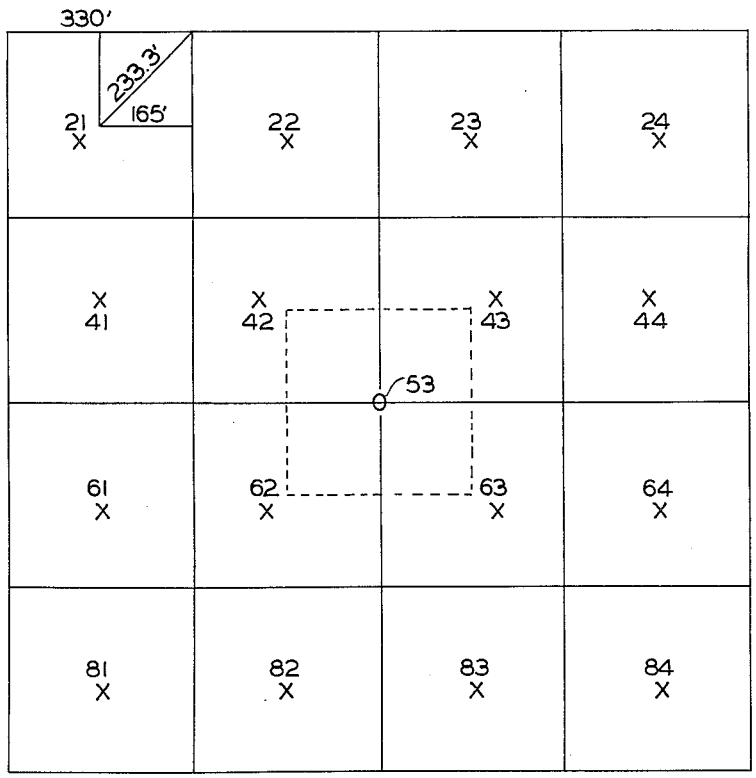
O = PRODUCING WELL
X = INJECTION WELLS
INVENTORS
HARRY L. PELZER
JOHN C. CALHOUN, JR.
ATTORNEYS 3,110,344
OIL RECOVERY PROCESS UTILIZING OIL-MISCIBLE SOLVENTS
Harry L. Pelzer, Venice, Fla., and John C. Calhoun, Jr., College Station, Tex., assignors, by mesne assignments, to Sinclair Research, Inc., New York, N.Y., a corporation of Delaware
Filed Oct. 23, 1959, Ser. No. 848,428
7 Claims. (Cl. 166—9)

Various methods have been devised for the recovery of oil and gas from subterranean formations, which, at this time, may be termed "conventional." These methods are to a great extent supplementary to each other and can be presented in the order in which they are applied to a given formation. In the first instance, upon the establishment of communication from the surface of the earth to a subterranean oil and gas bearing formation, the oil and gas are frequently forced through the communication path to the surface under the pressure prevailing in the formation. Following the exhaustion of a significant amount of pressure in the formation such that the natural flow of oil up the well bore ceases, recovery of the oil is continued by pumping means. However, when a negligible or uneconomical amount of oil flows freely to the well for pumping, the formation is sometimes gas repressured to drive the oil from the formation to the well. When gas repressuring is inexpedient, the oil can be forced into the well from an adjacent formation by driving a liquid, e.g. water, or gaseous medium through the formation as from an input to an output well. The processes employed to recover oil after pumping becomes disadvantageous, are usually referred to as secondary recovery methods.

The present invention is advantageous in overcoming the deficiencies of conventional methods of recovery of oil from subterranean formations which are inadequate when dealing with miscible solvents in oil recovery. Although these solvents as a class are effective, their use has been limited due to the prohibitive expense resulting from the loss of the solvent in underground formations during secondary recovery operations. The present invention is advantageous in that the problem of migration of the injected fluids is overcome and the natural retention of the solvent in the earth formation is either sharply reduced or eliminated. This invention is particularly applicable in situations where secondary recovery operations have become uneconomical and the area is watered out, i.e. water has been passed through the formation until the oil recovered during the water drive is insufficient to be economic.

After primary production in an oil field is completed, it has been found that by selectively injecting water and later solvents into the input wells good oil recovery is obtained at the output or production well. Furthermore, in the method of this invention superior solvent recovery is obtained when using either oil-miscible, water-immiscible solvents or oil and water-miscible solvents such as those commonly used in the oil industry today. Moreover, our method can be used to remove oil from previously unproduced or somewhat produced formations and even in heavier oil areas such as unconsolidated sands having oil of less than 15° API gravity.

In the process of this invention the injection wells are in generally concentric rings, with a minimum of two concentric well rings, surrounding an output well. An inner concentric ring is used for solvent injection and an outer ring is for water injection. Initially, water is injected into the outer ring of injection wells so that water flow is established from the outer ring past the inner ring of wells to the production well. Subsequently, an oil-miscible, water-immiscible solvent such as propane or carbon bisulfide or if desired alternatively an oil and water-miscible solvent such as butyl alcohol is added to the inner ring of wells so that the pressure in the formation forces the water and solvent to flow from the input wells toward the recovery or production well. In this procedure substantial amounts of oil and about 75 to 100% of the solvent utilized can be recovered. Thus this invention by maintaining the initial pattern of flow through the process supplies a simple, economical method for recovering oil by the miscible solvent process without undue loss of solvent. The method is particularly applicable to formations having a production and input well pattern as in a typical five-spot pattern used for water driving, providing the necessary wells around the production well. Of course, there can be a number of production wells and generally concentric rings of input wells employed to produce efficiently an entire oil reservoir or any part thereof. It may be desirable to locate a ring of water injection wells in the vicinity of the outer producing periphery of an oil field and inject solvent stepwise through succeeding rows of injection wells towards the center of the oil field to obtain progressive flow of solvent and oil towards one or more producing wells near the central location of the reservoir.

The solvent is added in amounts sufficient to recover substantial amounts of the remaining oil in the stratum. The selected solvent should be added in amounts from about 3 to 100% of the pore volume of the formation subtended by the solvent injection wells with a preferred amount of from about 10 to 50%. The formation subtended is generally considered to be that area included within the immediately surrounding input wells and the output well such as shown within the dotted lines of FIGURE 1.

If an oil-miscible volatile solvent is employed, the solvent injection can be followed by a gas addition into the solvent injection wells, thus resulting in vaporization of the oil-miscible, volatile solvent with subsequent recovery of the solvent at the producing well. The gas recovered from the producing well may be processed by conventional gas recovery methods to condense the solvent. Thus, the solvent may be reused in the process. The oil-miscible volatile solvents which may be employed in this process are numerous and examples of such commercial solvents are propane, butane, carbon bisulfide and carbon tetrachloride. A 50—50 volume mixture of pentane and carbon bisulfide seems particularly effective. The gases utilized to recover the oil-miscible solvent are numerous and are usually selected to make the separation problem the easiest or most economical considering the initial cost. Examples of these gases are air, exhaust gas and methane. If an oil and water-miscible solvent is utilized, there can be subsequent addition of water to the solvent injection wells in order to improve recovery of the solvent. This solution is then recovered at the producing well where it may be processed easily and inexpensively above the ground by some commercial process such as distillation and the like. Thus, the solvent is readily available to be used once again in the process. The water-oil-miscible solvents are of a general commercial nature such as ethyl, propyl and butyl alcohols. Shut-in wells may be present in the petroleum field where the secondary recovery process of this invention is taking place without inconvenience to the process.

While the above process indicates a procedure for inexpensive recovery of costly solvents utilized in secondary recovery operations of a single well, it becomes obvious that a similar peripheral water-solvent injection system would be as readily successful in recovery of substantial amounts of oil at any number of producing wells. The size of the petroleum field, type of crude oil, location, etc. will in each case, determine the positioning of the various wells, type and amounts of solvent utilized and the rate of flow of the solvents and water. For example, the use of carbon bisulfide with sufficient migration control in this process would be commercially successful in the recovery of heavy oils such as oils having an API gravity of 25 or lower. While in other commercial applications the use of propane or butane is preferred when the secondary recovery operations are attempting to recover light oils such as oils having a gravity of 25 or more. The rate of flow of the miscible solvent is generally determined by the characteristics of the oil field formation, solvent selected and the normal practices of those utilizing the process of this invention.

In providing the desired flow directions the pressure of injection of water and solvent into the formation of their respective input wells is greater than the formation resistance or pressure drop from the given injection wells to the production well. To prevent flow of solvent to the outer ring of wells, the difference between the water and solvent injection pressures is less than formation pressure drop between the inner and outer rings of wells. Also, the injection pressure of water injection is usually greater than that for the solvent injection.

Typical of the type of petroleum field where this process would find commercial application is shown by the following example and the drawing.

*Example 1*

A recovery well 53 is centrally located in a square 330 x 330 feet with solvent injection wells 42, 43, 62 and 63 placed at the corners of the square so as to form a ring around output well 43. A second concentric ring of water input wells 21, 22, 23, 24, 44, 64, 84, 83, 82, 81, 61 and 41 are located so as to surround the interior ring containing output well 53. The formation pressure drop between the outer and inner well rings is about 300 pounds and is about 300 pounds between the inner ring of wells and the production well. After primary production is finished and, if desired, a water flood is completed, the injection is continued at the rate of 5 gallons per minute and 600 pounds injection pressure at each exterior ring wells 21, 22, 23, 24, 41, 44, 61, 64, 81, 82, 83, and 84 while the water injection to interior wells 42, 43, 62 and 63 is stopped, resulting in a flow of water from the outer ring of wells to the output or production well. Butyl alcohol, carbon bisulfide or a 50—50 pentane-carbon bisulfide mixture is then injected into each of wells 42, 43, 62 and 63 at the rate of 5 gallons per minute and 300 to 600 pounds injection pressure and flows toward the output well 53 where there is recovery of the butyl alcohol, water and oil. After solvent injection is completed, the water injection is continued to recover the solvent remaining in the formation enclosed within wells 42, 43, 63 and 62.

In our method the positioning and number of injection wells is essentially a question dependent upon the conditions and requirements of the petroleum field, but generally there is at least two concentric surrounding injection well rings so that the solvent injected into the interior ring is directed toward the centrally-located output well.

We claim:

1. In a method for recovery of oil from an oil-bearing subterranean formation wherein injection wells provide communication with the oil-bearing formation and recovery is effected at a production well, the steps which comprise injecting water into input wells surrounding a production well to establish water flow to the output well, continuing said injecting while injecting an oil-miscible solvent into the formation through wells surrounding the production well and located between the production well and the water input wells to establish flow of solvent to said output well.

2. The method of claim 1 in which the solvent injection is followed by injection in the solvent injection wells of a stripping agent selected from the group of gas and water.

3. A method of claim 2 wherein the oil-miscible solvent is an oil-miscible, water-immiscible solvent and the stripping agent is a gas.

4. The method of claim 2 wherein the oil-miscible solvent is an oil and water-miscible solvent and the stripping agent is water.

5. The method of claim 1 in which water flow from wells surrounding said solvent injection wells to the production well is effected after solvent injection is completed to recover solvent in the formation.

6. In a method for recovery of oil from an oil-bearing subterranean formation wherein injection wells provide communication with the oil-bearing formation and recovery is effected at a production well, the steps which comprise injecting water into input wells surrounding a production well to establish water flow to the output well, continuing said injecting while injecting the oil-miscible solvent into the formation in amounts from about 3–100 percent of the pore volume of said formation through wells surrounding the production well and located between the production well and the water input wells to establish flow of solvent to said output well.

7. The method of claim 6 where the amount of solvent injected is from about 10 to 50 percent of the pore volume of said formation.

References Cited in the file of this patent

UNITED STATES PATENTS

| | | |
|---|---|---|
| 2,630,182 | Klotz | Mar. 3, 1953 |
| 2,669,307 | Mulholland et al. | Feb. 16, 1954 |
| 2,718,263 | Heilman et al. | Sept. 20, 1955 |
| 2,798,556 | Binder et al. | July 9, 1957 |
| 2,927,637 | Draper | Mar. 8, 1960 |

OTHER REFERENCES

Uren, L. C.: "Petroleum Production Engineering," vol. II (Exploitation), 2d ed., page 455, McGraw-Hill, 1939.